United States Patent
Hu

(10) Patent No.: US 8,635,482 B2
(45) Date of Patent: Jan. 21, 2014

(54) MOTHERBOARD WITH DELAY CIRCUIT

(75) Inventor: Ke-You Hu, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 143 days.

(21) Appl. No.: 13/169,765

(22) Filed: Jun. 27, 2011

(65) Prior Publication Data

US 2012/0159033 A1 Jun. 21, 2012

(30) Foreign Application Priority Data

Dec. 20, 2010 (CN) .......................... 2010 1 0596206

(51) Int. Cl.
*G06F 1/00* (2006.01)
*G06F 1/26* (2006.01)

(52) U.S. Cl.
CPC ........................ *G06F 1/26* (2013.01)
USPC ........................................................ 713/330

(58) Field of Classification Search
USPC .................................................. 713/300–340
See application file for complete search history.

(56) References Cited

U.S. PATENT DOCUMENTS

| | | | |
|---|---|---|---|
| 8,195,963 B2 * | 6/2012 | Zhou et al. ..................... | 713/300 |
| 2005/0022043 A1 * | 1/2005 | Yamaji et al. .................. | 713/340 |
| 2006/0044028 A1 * | 3/2006 | Bhattacharya et al. ....... | 327/143 |
| 2006/0053310 A1 * | 3/2006 | Su et al. ......................... | 713/300 |
| 2009/0174443 A1 * | 7/2009 | Li et al. ......................... | 327/143 |
| 2010/0262849 A1 * | 10/2010 | Chan et al. .................... | 713/320 |
| 2010/0325464 A1 * | 12/2010 | Hu ................................ | 713/330 |
| 2012/0047381 A1 * | 2/2012 | Zhou et al. .................... | 713/323 |

* cited by examiner

*Primary Examiner* — Raymond Phan
(74) *Attorney, Agent, or Firm* — Altis Law Group, Inc.

(57) ABSTRACT

A motherboard includes an I/O chip, a south bridge chip, and a delay circuit. The I/O chip detects a standby voltage on the motherboard and outputs an indicating signal that indicates whether the standby voltage is at high level. The south bridge chip is connected to the I/O chip to receive the indicating signal. The delay circuit is connected to the I/O chip and the south bridge chip. The delay circuit delays the indicating signal before sending the indicating signal to the south bridge chip.

11 Claims, 3 Drawing Sheets

MOTHERBOARD WITH DELAY CIRCUIT

BACKGROUND

1. Technical Field

The present disclosure relates to motherboards, and more particularly to a motherboard with a signal delay circuit.

2. Description of Related Art

Referring to FIG. 3, a typical motherboard of a computer includes an Input/Output (I/O) chip, a south bridge chip, a north bridge chip, and a central processing unit (CPU). To power up the motherboard, a power connector on the motherboard is connected to a power supply box. The power connector of the motherboard typically includes 20 pins or 24 pins. The power supply is connected to an alternative current (AC) power source and outputs direct current (DC) power feeds to the motherboard via the power connector. When a standby voltage supplied from the power supply to the motherboard raises from a low level (0V) to a high level (5V), the I/O chip outputs a high level RSMRST# signal to the south bridge chip to inform the south bridge chip that the standby voltage is ready. Then the motherboard can be powered up according to a predetermined power on sequence. The motherboard can be powered on or off normally when the power supply is powered on or off. However, if the motherboard is powered on or powered off in an abnormal manner while the power connector of the motherboard is connected to or is disconnected from the power supply. The RSMRST# signal is easily disturbed and rises to a high level earlier than the predetermine time, which will cause the power on sequence of the motherboard to have an error.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
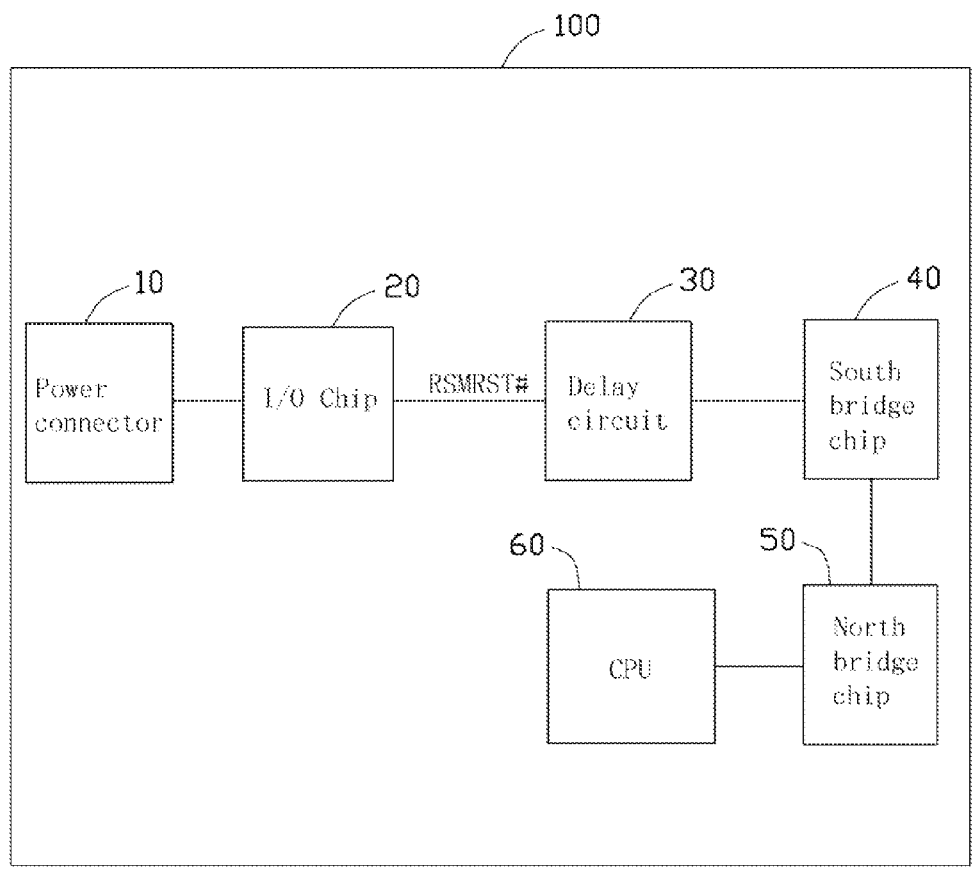
FIG. 1 is a block diagram of a motherboard according to an embodiment.

Referring to FIG. 1, an embodiment of a motherboard 100 includes a power connector 10 configured to connect a power supply (not shown) which supplies power to the motherboard 100, an I/O chip 20, a delay circuit 30, a south bridge chip 40, a north bridge chip 50, and a CPU 60. The I/O chip 20 is connected to the power connector 10 to detect the level of the standby voltage supplied to the motherboard 100. The delay circuit 30 is connected between the I/O chip 20 and the south bridge chip 40 to delay a RSMRST# signal sent from the I/O chip 20 to the south bridge chip 40. The south bridge chip 40 is communicatively connected to the north bridge chip 50. The north bridge chip 50 is communicatively connected to the CPU 60.

Figure 2:
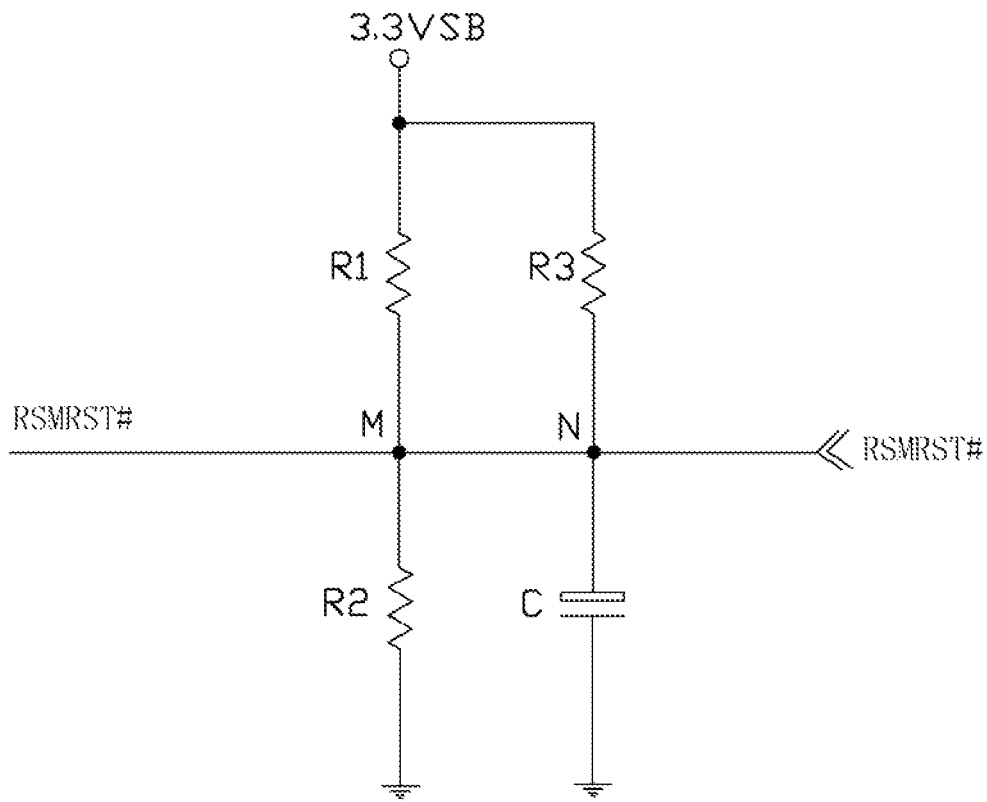
FIG. 2 is a detailed circuit of a delay circuit of FIG. 1.
Figure 3:
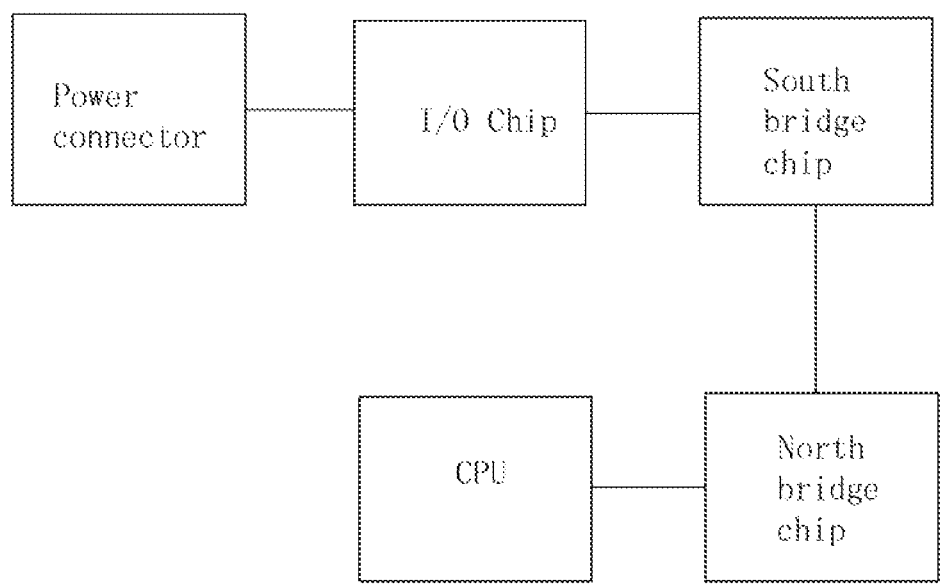
FIG. 3 is a block diagram of a motherboard according to prior art.

Referring to FIG. 2, the delay circuit 30 includes a first resistor R1, a second resistor R2, a third resistor R3, and a capacitor C. A first terminal of the first resistor R1 is connected to a 3.3V standby voltage. A second terminal of the first resistor R1 is connected to a first node M. A first terminal of the second resistor R2 is connected to the first node M. A second terminal of the second resistor R2 is connected to ground. A first terminal of the third resistor R3 is connected to the 3.3V standby voltage. A second terminal of the third resistor R3 is connected to a second node N. The capacitor C is a polarity capacitor. An anode of the capacitor C is connected to the second node N. A cathode of the capacitor C is connected to ground. The second node N is connected to a RSMRST# pin of the south bridge chip 40. The delay circuit 30 send the RSMRST# signal sent from the I/O chip 20 to the south bridge chip 40 after a delay time T (T=(R1×R2×C)/(R1+R3)). In one embodiment, a resistance of the first resistor R1 is ten times the resistance of the third resistor R3. The resistance of the second resistor R2 is 470 times the resistance of the third resistor R3. For instance, if the resistance of the first resistor R1 is 1 kilohms (KΩ), the resistance of the second resistor R2 is 47 KΩ, and the resistance third resistor R3 is 100Ω. In one embodiment, a capacitance of the capacitor C is 300 microfarads (mf). The delay time T is 30 milliseconds.

When the motherboard 100 is powered on in an normal manner by powering on or off the power supply connected to the power connector 10, the I/O chip 20 outputs a high level RSMRST# signal to the delay circuit 30 after a standby voltage on the power connector 10 turns to a high level. The delay circuit 30 sends the high level RSMRST# signal to the south bridge chip 40 after the delay time T to inform the south bridge chip 40 that the standby voltage is ready. Then the motherboard 100 is powered on as a predetermined power on sequence and not influenced by the delay of the RSMRST# signal.

When the motherboard 100 is powered on in an abnormal manner by connecting the power connector 10 to the power supply in a power on state, the RSMRST# pin of the I/O chip 20 turns to a high level at the moment of plugging in the power connector 10. The standby voltage supplied to the motherboard 100 is not yet turned to the high level. The delay circuit 30 delays the RSMRST# signal until the standby voltage is turned to the high level. The south bridge chip 40 receives the high level RSMRST# signal no earlier than when the standby voltage is turned to the high level. Then the motherboard 100 can also be powered on as the predetermined power on sequence.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A motherboard comprising:
an Input/Output (I/O) chip adapted to detect a standby voltage on the motherboard and output an indicating signal that indicates whether the standby voltage is at high level;

a south bridge chip, connected to the I/O chip, adapted to receive the indicating signal; and a delay circuit, connected to the I/O chip and the south bridge chip, adapted to delay the indicating signal before sending the indicating signal to the south bridge chip;

wherein the delay circuit comprises a first resistor, a second resistor, and a capacitor; a first terminal of the first resistor is coupled to a power source, a second terminal of the first resistor is connected to a first terminal of the second resistor and connected to the I/O chip to receive the indicating signal, and a second terminal of the second resistor is connected to ground; a first terminal of the capacitor is connected to the first terminal of the second resistor and connected to the south bridge chip to output the delayed indicating signal, and a second terminal of the capacitor is connected to ground.

2. The motherboard of claim 1, wherein the delay circuit comprises a third resistor, and the first resistor and the third resistor are connected in parallel.

3. The motherboard of claim 1, wherein the capacitor is polarity capacitor with an anode connected to the first terminal of the second resistor and a cathode connected to ground.

4. The motherboard of claim 2, wherein a first resistance of the first resistor is greater than a third resistance of the third resistor, and less than a second resistance of the second resistor.

5. The motherboard of claim 4, wherein the first resistance is 10 times of the third resistance, and the second resistance is 470 times of the third resistance.

6. A motherboard comprising:

a power connector adapted to transmit power rails including a standby voltage to the motherboard;

an Input/Output (I/O) chip, connected to the power connector, adapted to output an indicating signal to indicate whether the standby voltage is at a high level;

a delay circuit, connected to the I/O chip, adapted to delay the indicating signal; and the delay circuit comprising a first resistor, a second resistor, and a capacitor; a first terminal of the first resistor is coupled to a power source, a second terminal of the first resistor is connected to a first terminal of the second resistor and connected to the I/O chip to receive the indicating signal, and a second terminal of the second resistor is connected to ground; a first terminal of the capacitor is connected to the first terminal of the second resistor and connected to the south bridge chip to output the delayed indicating signal, and a second terminal of the capacitor is connected to ground; and a south bridge chip, connected to the delay circuit, adapted to receive the indicating signal after a delay time determined by the delay circuit.

7. The motherboard of claim 6, wherein the delay circuit comprises a third resistor, and the first resistor and the third resistor are connected in parallel.

8. The motherboard of claim 7, wherein a first resistance of the first resistor is greater than a third resistance of the third resistor, and less than a second resistance of the second resistor.

9. The motherboard of claim 8, wherein the first resistance is 10 times of the third resistance, and the second resistance is 470 times of the third resistance.

10. The motherboard of claim 6, wherein the capacitor is polarity capacitor with an anode connected to the first terminal of the second resistor and a cathode connected to ground.

11. The motherboard of claim 6, further comprising a north bridge chip connected to the south bridge chip and a central processing unit connected to the north bridge chip.

* * * * *